C. E. CLEMENS & R. K. JOHNSON.
VEHICLE SPRING.
APPLICATION FILED JULY 28, 1915.

1,239,084.

Patented Sept. 4, 1917.

INVENTORS
Chester E. Clemens
BY Royal K. Johnson
Hull, Smith, Buck & West
ATTYS.

UNITED STATES PATENT OFFICE.

CHESTER E. CLEMENS AND ROYAL K. JOHNSON, OF CLEVELAND, OHIO, ASSIGNORS, BY MESNE ASSIGNMENTS, TO THE STANDARD PARTS COMPANY, OF CLEVELAND, OHIO, A CORPORATION OF OHIO.

VEHICLE-SPRING.

1,239,084.      Specification of Letters Patent.      Patented Sept. 4, 1917.

Application filed July 28, 1915. Serial No. 42,267.

*To all whom it may concern:*

Be it known that we, CHESTER E. CLEMENS and ROYAL K. JOHNSON, citizens of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to the means whereby a driving connection is formed between one end of such a spring and the vehicle frame or body. While the invention disclosed herein is probably capable of more general application, it is particularly designed with reference to motor vehicles. As a great number of these vehicles are now equipped, the spring suspensions are so designed that the driving and torque strains are taken through the springs alone. When the vehicle body is suspended by springs connected in this manner, there is serious danger that damage may result through the breakage of the main plate of the spring through which the aforesaid driving and torque strains must pass. When such breakage occurs, the spring is not only put out of commission, but the vehicle is itself endangered.

It is the object of our invention to provide a vehicle with a spring so constructed and connected that, while designed to take the driving and torque strains in the manner above set forth, it will not be put out of commission by the breaking or undue bending of the main plate under strains, with the objectionable consequences referred to hereinbefore.

Figure 1:
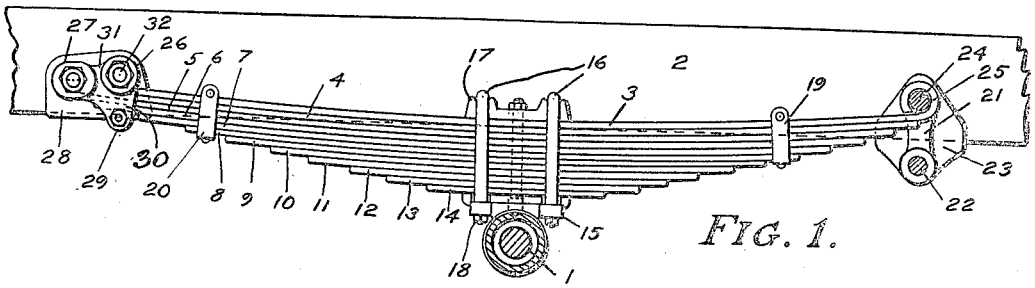
Figure 2:
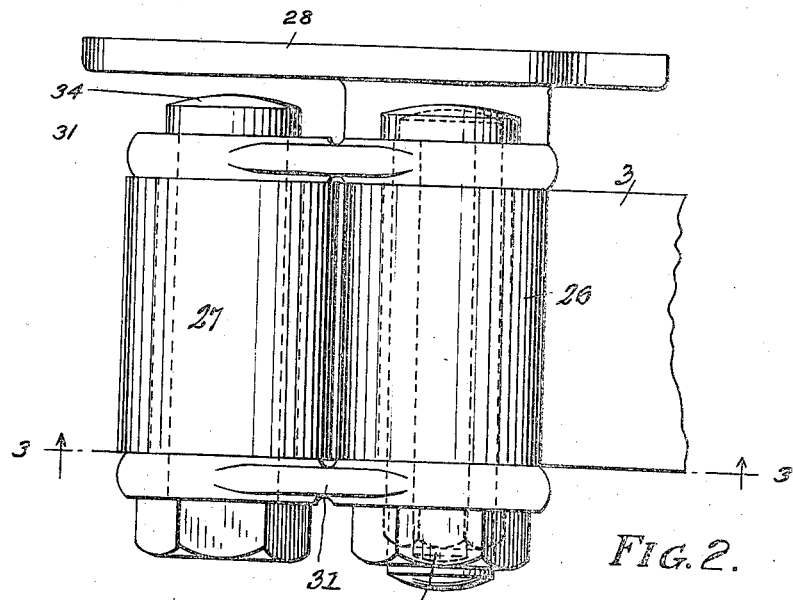
Figure 3:
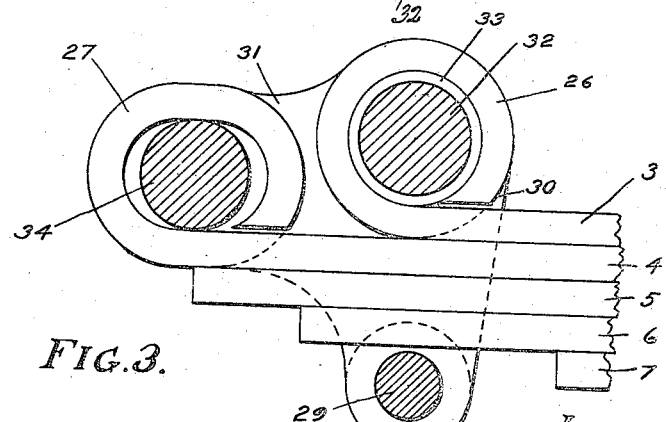

We accomplish the objects referred to in and through a construction such as shown in the drawing forming part hereof, wherein Figure 1 represents a side elevation of part of a vehicle frame and of a spring connected thereto, the axle being shown in section; Fig. 2 is a detail in plan of the shackle construction employed at one end of the spring shown in Fig. 1; and Fig. 3 is a sectional detail of one end of the spring and the shackle, the section corresponding substantially to the line 3—3 of Fig. 2.

Describing by reference characters the various parts illustrated herein, 1 denotes the axle and 2 a part of the side frame of an automobile. 3 denotes the main plate and 4, 5, 6, 7, 8, 9, 10, 11, 12, 13, and 14 the auxiliary plates of the spring, the spring herein shown being a spring such as designed for use with motor trucks. The spring is connected at its central portion to the axle by means of a spring seat 15 on the axle and inverted U-shaped clips 16 having threaded ends extending through said seat and their looped portions extending across an upper clamping member 17, the nuts on the threaded ends of the clips being indicated at 18. 19 and 20 indicate rebound shackles interposed between the central and end portions of the spring and located adjacent to the ends.

As the construction shown herein is applicable to the rear axles of automobiles, the drive being taken through the front end of the spring, the rear end of the spring is connected to shackle links 21 which project upwardly from a pin 22 carried by a bracket 23 secured to the frame, the pin 24 at the free or swinging ends of the shackle links extending through an eye 25 of the main plate. The opposite end of the main plate is provided with an eye 26 while the first auxiliary plate 4, below the main plate, extends beyond the end of the main plate and there is provided with an elongated eye 27.

28 denotes a bracket which is secured to the frame 2 and which is provided with a shackle-supporting pin 32. To this pin there is pivoted a pair of triangular or "three-point" shackle links comprising each a vertically extending portion 30 and a laterally or forwardly extending portion 31. A pin 29 is shown as supported by and between the lower ends of the vertically extending portions 30 of the shackle links. A bushing 33 is shown as surrounding the pin 32, and this bushing occupies the eye 26 on the end of the main plate 3. A shackle pin 34 extends through the front corners of the shackle links and through the elongated eye 27 at the front end of the auxiliary plate 4. Under ordinary conditions, the drive will be from the axle 1 through the front end of the spring (especially through the main plate 3, eye 26 and pin 32) to the vehicle frame, the elongated eye 27 permitting the usual flexing of the spring without any actual driving engagement between the plate 4 and the pin 34. The pin 29 will not ordinarily engage or contact with the end of the spring plate 6, there being sufficient clearance between said pin and said plate to accommodate the longitudinal movements of the end of the spring with respect to said pin. The pin 29, however, because of its proximity to the spring plates thereabove, acts as a recoil pin to such plates.

Assuming that the main plate 3 should break or bend excessively through the driving and torque strains imposed thereupon, there will be a slight movement of the front end of the spring—until the pin 34 engages the rear end of the eye 27—whereupon the driving connection between the spring and the frame will be reëstablished. Any rotary movement of the shackle in either direction will be limited by the wedging action exerted upon the leaves of the spring interposed between the pin 29 and the pin 34. It will be noted that several leaves are thus confined by the shackles and that there is thus provided a substantial body of metal to resist and withstand the torque strains.

By the construction above described, we are able, not only to provide for an emergency created by the breaking or bending or elongating of the main plate, but also, in the same construction, to provide means whereby the leaves or plates are prevented from separating on recoil, or under torque strains, and also to provide, where desired, a quantity of metal in the spring amply sufficient to take care of such torque strains.

By the manner of connecting the main plate 3 and the auxiliary plate 4 to the frame, the latter plate ordinarily will perform no driving function. However, should the main plate break, or should it become ineffective for the purpose of taking all of the drive (as may happen under severe driving conditions) the rear end of the eye 27 on the auxiliary plate will come into engagement with the pin 34. The auxiliary plate, therefore, will come into play should the main plate become broken or should it become wholly or partly ineffective as the driving connection between the axle and the frame.

Having thus described our invention, what we claim is:—

1. The combination, with a vehicle frame and axle, of a spring comprising a main plate and one or more auxiliary plates extending beyond an end of the main plate, means connecting the spring to the axle, and means connecting an end of the spring to the frame, the last mentioned connecting means comprising an eye on the main plate and an eye on the auxiliary plate adjacent thereto and extending therebeyond, one of such eyes being elongated, and pins extending through said eyes, one of said pins being carried by the frame.

2. The combination, with a vehicle frame and axle, of a spring comprising a main plate and one or more auxiliary plates, means connecting the spring to the axle, and means connecting an end of the spring to the frame, the last mentioned connecting means comprising an eye on the main plate and an eye on the auxiliary plate adjacent thereto, one of such eyes being elongated, and pins extending through said eyes, one of said pins being carried by the frame.

3. The combination, with a vehicle frame and axle, of a spring comprising a main plate and one or more auxiliary plates projecting at one end beyond the corresponding end of the main plate, means connecting the spring to the axle, and means connecting said end of the spring to the frame, the last mentioned means comprising a pair of shackle links pivoted to the frame and having longitudinally spaced pins extending therethrough, said pins extending through eyes on the main plate and on the auxiliary plate adjacent thereto, one of said eyes being elongated.

4. The combination, with a vehicle frame and axle, of a spring comprising a main plate and one or more auxiliary plates, means connecting the spring to the axle, and means connecting an end of the spring to the frame, the last mentioned means comprising a pair of shackle links pivoted to the frame and having longitudinally spaced pins extending therethrough, said pins extending through eyes on the main plate and on the auxiliary plate, one of said eyes being elongated.

5. The combination, with a vehicle frame and axle, of a spring comprising a main plate, an auxiliary plate adjacent to and extending beyond one end of the main plate and one or more auxiliary plates extending as far as the end of the main plate, the main plate and the auxiliary plate adjacent thereto each having an eye at such end of the spring and the eye on the auxiliary plate being elongated, means connecting the spring to the axle, a shackle pivotally connected to the frame and having longitudinally spaced pins extending through the aforesaid eyes and a third pin arranged to bind the plates interposed between the main plate and said third pin by movement of the shackle in either direction about its pivot, and a flexible connection between the opposite end of the spring and the frame.

6. The combination, with a vehicle frame and axle, of a spring comprising a main plate, an auxiliary plate adjacent to and extending beyond one end of the main plate and one or more auxiliary plates extending as far as the end of the main plate, the main plate and the auxiliary plate adjacent thereto each having an eye at such end of the spring and one of such eyes being elongated, means connecting the spring to the axle, and a shackle pivotally connected to the frame and having longitudinally spaced pins extending through the aforesaid eyes and a third pin arranged to bind the plates interposed between the main plate and said third pin by movement of the shackle in either direction about its pivot.

7. The combination, with a vehicle frame, of a pin projecting from said frame, a pair of shackle links pivoted to said pin, said links having a pin longitudinally and another pin vertically spaced from the first pin, and a spring having a main plate and one or more auxiliary plates extending as far as the end of the main plate whereby such auxiliary plate or plates may be interposed between the main plate and the third mentioned pin, the main plate having an eye through which one of the first two mentioned pins is adapted to extend and the auxiliary plate adjacent thereto having an elongated eye through which the other may extend, the pins being so arranged that the auxiliary plate or plates will be clamped, by a rotary movement of the shackle links, between the first and third mentioned pins.

8. The combination, with a vehicle frame, of a pin projecting from said frame, a pair of shackle links pivoted to said pin, said links having a pin longitudinally and another pin vertically spaced from the first pin, and a spring having a main plate and one or more auxiliary plates extending as far as the end of the main plate whereby such auxiliary plate or plates may be interposed between the main plate and the third mentioned pin, the main plate having an eye through which one of the first two mentioned pins is adapted to extend and the auxiliary plate adjacent thereto having an eye through which the other may extend, one of said eyes being elongated and the pins being so arranged that the auxiliary plate or plates will be clamped, by a rotary movement of the shackle, between the first and third mentioned pins.

9. The combination, with a vehicle frame and axle, of means connecting the central or body portion of the spring to the axle, means flexibly connecting one end of said spring to the frame, and means connecting longitudinally spaced portions of the opposite end of the spring to the frame, one of such last mentioned connections being a lost motion connection whereby it will be ineffective as a driving connection unless and until the other connection becomes broken or ineffective.

10. The combination, with a vehicle frame and axle, of means connecting the spring to the axle, and means connecting longitudinally spaced portions of one end of the spring to the frame, one of such last mentioned connections being a lost motion connection whereby it will be ineffective as a driving connection unless and until the other connection becomes broken or ineffective.

11. The combination, with a vehicle frame and axle, of a spring comprising a main plate and one or more auxiliary plates extending at one end beyond the corresponding end of the main plate, means connecting the body portion of the spring to the axle, means connecting the aforesaid end of the spring to the frame, said last mentioned means comprising an eye on the main plate, a pin extending through said eye and carried by the frame and securing a driving connection therewith, an elongated eye carried by the projecting end of the auxiliary plate adjacent to the main plate, and a pin having connection with the frame and extending through the last mentioned eye whereby the connection between the last mentioned plate and the spring becomes operative through the breaking or failure of the connection between the main plate and the frame, and means flexibly connecting the opposite end of the spring to the frame.

12. The combination, with a vehicle frame and axle, of a spring comprising a main plate and a plurality of auxiliary plates one of which extends beyond the main plate at one end of the spring, the main plate being provided with an eye and the end of the auxiliary plate adjacent thereto being provided with an elongated eye, means connecting the central portion of the spring to the axle, a pin carried by the frame, shackle links pivoted thereto and having a pin longitudinally and another pin vertically spaced from the pivot pin, the pivot pin extending through the eye of the main plate and the first of the other pins extending through the elongated eye of the auxiliary plate adjacent to the main plate, the second of the other pins and the pivot pin being so arranged as to confine the ends of the auxiliary plates therebetween, and means flexibly connecting the opposite end of the spring to the frame.

13. The combination, with a vehicle frame and axle, of a spring comprising a main plate and a plurality of auxiliary plates one or more of which extends beyond the main plate at one end of the spring, the main plate and the auxiliary plate adjacent thereto being provided each with an eye, one of said eyes being elongated, means connecting the spring to the axle, a pin carried by the frame, shackle links pivoted thereto and having a pin longitudinally and a second pin vertically spaced from the pivot pin, the pivot pin extending through the eye of the main plate and the first of the other pins extending through the eye of the auxiliary plate adjacent to the main plate, the shackle pivot pin and the second of the other pins being so arranged as to confine the ends of the auxiliary plates therebetween.

14. The combination, with a vehicle frame and axle, of a spring comprising a main plate and a plurality of auxiliary plates, the auxiliary plate which is adjacent to the main plate extending beyond said main plate at one end of the spring and one or more of the additional auxiliary plates also extending as far as the end of said main plate at such end of the spring, means connecting the body portion of the spring to the axle, a pin carried by the frame, a pair of shackle links pivoted to said pin and having toward their free or swinging ends a pair of pins one of which is longitudinally spaced from the pivot with reference to the length of the spring, an eye on the main plate through which the pivot pin extends, and an elongated eye on the plate adjacent to the main plate through which the longitudinally spaced pin extends, the distance between the pivot pin and the other shackle pin being substantially equal to the thickness of the projecting end of the spring thereabove whereby, should the connection between the main plate and the pivot pin become inoperative, connection will be established between the auxiliary plate next adjacent to the main plate and the shackle pin to which it has connection and the rotary movement of the shackle be limited by the ends of the spring plates interposed between the pivot pin and the other shackle pin, and means flexibly connecting the opposite end of the spring to the frame.

15. The combination, with a vehicle frame and axle, of a spring comprising a main plate and a plurality of auxiliary plates, means connecting the body portion of the spring to the axle, a pin carried by the frame, a pair of shackle links pivoted to said pin and having toward their free or swinging ends a pair of pins which are spaced respectively longitudinally and vertically from the pivot pin with reference to the length of the spring, an eye on the main plate through which one of the longitudinally spaced pins extends, an eye on the plate adjacent to the main plate through which the other longitudinally spaced pin extends, one of said eyes being elongated, there being one or more auxiliary plates interposed between the last mentioned auxiliary plate and the vertically spaced pin and the distance between such vertically spaced pin and the pin extending through the eye of such auxiliary plate being substantially equal to the aggregate thickness of the interposed ends of the auxiliary plates, whereby, should the connection between one of such connected plates and its pin become inoperative, connection will be established between the plate having the elongated eye and its respective pin and the rotary movement of the shackle will be limited by the ends of the spring interposed between the vertically spaced pin and one of the other pins, and means flexibly connecting the opposite ends of the spring to the frame.

16. The combination, with a vehicle frame and axle, of means connecting the spring to the axle, and means connecting portions of one end of the spring to the frame, one of the last mentioned connections being a lost-motion connection whereby it will be ineffective as a driving connection unless and until the other connection becomes broken or ineffective.

17. The combination of a supporting member, a spring, connecting means comprising a pintle on the supporting member coöperating with the spring, an auxiliary connecting means normally out of contact with the spring constructed and arranged to become operative when the first-mentioned means becomes inoperative.

18. In a spring construction, a plurality of superposed leaves, one of which is provided with an eye whereby it may be attached to a supporting member to form the connection therebetween, and auxiliary connecting means between another leaf and the supporting member constructed and arranged to become operative when the connection through said eye is broken.

19. In spring construction, a plurality of superposed leaves, one of which is provided with an eye at one end, adapted to receive a pintle to connect the spring with a supporting member, and another of which is so formed as to be connected with the supporting member only when the connection through said eye is broken.

20. The combination of a supporting member, a spring having a plurality of leaves each of which is provided with means whereby it may be attached to said supporting member, and pintles adapted to separately coöperate with said means to form the connection between the spring and the supporting member, one of said pintles normally forming said connection and the other normally out of contact with its coöperating means and serving as an emergency connection only when the first connection is broken.

In testimony whereof, we hereunto affix our signatures:

CHESTER E. CLEMENS.
ROYAL K. JOHNSON.